US009800299B2

(12) United States Patent
Gao et al.

(10) Patent No.: US 9,800,299 B2
(45) Date of Patent: Oct. 24, 2017

(54) METHOD AND DEVICE FOR COORDINATED SCHEDULING

(75) Inventors: Qiubin Gao, Beijing (CN); Deshan Miao, Beijing (CN); Hao He, Beijing (CN); Shaohui Sun, Beijing (CN); Ying Peng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 13/386,425

(22) PCT Filed: Sep. 25, 2010

(86) PCT No.: PCT/CN2010/077290
§ 371 (c)(1),
(2), (4) Date: Jan. 22, 2012

(87) PCT Pub. No.: WO2011/038661
PCT Pub. Date: Apr. 7, 2011

(65) Prior Publication Data
US 2012/0122468 A1    May 17, 2012

(30) Foreign Application Priority Data
Sep. 29, 2009    (CN) .......................... 2009 1 0235535

(51) Int. Cl.
*H04W 72/00* (2009.01)
*H04B 7/026* (2017.01)
(Continued)

(52) U.S. Cl.
CPC ........... *H04B 7/026* (2013.01); *H04B 7/0639* (2013.01); *H04W 72/1226* (2013.01);
(Continued)

(58) Field of Classification Search
CPC . H04W 92/20; H04W 16/28; H04W 72/1278; H04W 72/121; H04W 72/1226; H04B 7/024; H04B 7/0639
(Continued)

(56) References Cited

U.S. PATENT DOCUMENTS 8,179,775 B2 * 5/2012 Chen et al. .................... 370/203
8,184,544 B2 * 5/2012 Ko et al. ....................... 370/249
(Continued)

FOREIGN PATENT DOCUMENTS

CN         1882156 A      12/2006
CN       101772176 A      7/2010
(Continued)

OTHER PUBLICATIONS

International Search Report issued International Application No. PCT/CN2010/077290, dated Dec. 30, 2010.
(Continued)

*Primary Examiner* — Kwasi Karikari
(74) *Attorney, Agent, or Firm* — Handal & Morofsky LLC

(57) ABSTRACT

Disclosed in the present invention is a coordinated scheduling method which includes that: a base station establishes the correspondences between sub-bands and spatial information, and communicates the correspondences between sub-bands and spatial information with the base station of a cooperative cell (301); said base station implements coordinated scheduling with the base station of said cooperative cell according to the correspondences between sub-bands and spatial information (302). The present invention implements that less scheduling information is transmitted via an X2 interface, and thus promotes the application of the CBF solution in an actual system.

12 Claims, 6 Drawing Sheets

303 — base station establishes the correspondences between sub-bands and spatial information, and interacts the correspondences between sub-bands and spatial information with the base station of a cooperative cell 304 — said base station implements coordinated scheduling with the base station of said cooperative cell according to the correspondences between sub-bands and spatial information

(51) Int. Cl.
*H04B 7/06* (2006.01)
*H04W 72/12* (2009.01)
*H04W 92/20* (2009.01)

(52) U.S. Cl.
CPC ...... *H04W 72/121* (2013.01); *H04W 72/1205* (2013.01); *H04W 92/20* (2013.01)

(58) Field of Classification Search
USPC ....... 455/452.1, 62, 63.1; 370/252, 329, 328
See application file for complete search history.

(56) References Cited

U.S. PATENT DOCUMENTS

| | | | |
|---|---|---|---|
| 2009/0264142 A1* | 10/2009 | Sankar | H04L 5/0007 455/501 |
| 2010/0177725 A1* | 7/2010 | van Rensburg | 370/329 |
| 2010/0273499 A1* | 10/2010 | van Rensburg et al. | 455/450 |
| 2010/0291940 A1* | 11/2010 | Koo et al. | 455/450 |
| 2011/0105164 A1* | 5/2011 | Lim et al. | 455/501 |
| 2011/0268068 A1* | 11/2011 | Jian et al. | 370/329 |
| 2011/0269459 A1* | 11/2011 | Koo et al. | 455/434 |

FOREIGN PATENT DOCUMENTS

| | | |
|---|---|---|
| WO | 2009/070928 A1 | 6/2009 |
| WO | 2009070928 A1 | 6/2009 |

OTHER PUBLICATIONS

Samsung; "Inter-Cell Interference Mitigation Through Limited Coordination"; 3GPP TSG RAN WG1 Meeting #54; R1-082886; Jeju, Korea, Aug. 18-22, 2008.
Alcatel-Lucent; UE PMI Feedback signalling for user pairing/coordination; 3GPP TSG RAN WG1 #56 Meeting; R1-090777; Athens, Greece, Feb. 9-13, 2009.
LG Electronics; "CoMP Configurations and UE/eNB Behaviors in LTE-advanced"; 3GPP TSG RAN WG1 Meeting #56; R1-090782; Athens, Greece, Feb. 9-13, 2009.
Motorola; "Coordinated Beamforming Algorithms Based on Spatial Covariance Feedback and its Gain over Single-point SU/MU Beamforming"; 3GPP TSG RAN1#58; R1-093410; Shenzen, CN.
European Patent Office; Extended European Search Report; dated Sep. 29, 2016.
Decision of Reexamination issued in Chinese patent application No. 200910235535.6, dated Mar. 17, 2016 (In Chinese).
Decision of Reexamination issued in Chinese patent application No. 200910235535.6, dated Mar. 17, 2016 (In English).
Office action issued in Chinese patent application No. 200910235535.6, dated Nov. 6, 2013 (in Chinese).
Office action issued in Chinese patent application No. 200910235535.6, dated Nov. 6, 2013 (English Translation).
Office action issued in Chinese patent application No. 200910235535.6, dated Feb. 22, 2013 (in Chinese).
Office action issued in Chinese patent application No. 200910235535.6, dated Feb. 22, 2013 (English Translation).

* cited by examiner

--Prior art--

--Prior art--

METHOD AND DEVICE FOR COORDINATED SCHEDULING

The present application claims the priority of the Chinese patent application with the application date of Sep. 29, 2009, the application number of 200910235535.6, and the patent name of "method and device for coordinated scheduling", all content of the priority application is incorporated into the present application by reference.

FIELD OF THE PRESENT INVENTION

The present invention relates generally to the field of communication technology, and more particularly to method and device for coordinated scheduling.

BACKGROUND OF THE PRESENT INVENTION

International Telecommunication Union (ITU) proposes very high requirement to the next generation mobile communication system that international mobile telecommunications-advanced (IMT-Advanced), such as the maximum system bandwidth need to reach 100 MHz, peak data rate of uplink and downlink data transmission respectively need to reach 1 Gbps and 500 Mbps; at the same time, it proposes very high requirement to average spectral efficiency of system, especially to edge spectral efficiency. To satisfy the requirement of IMT-Advanced system, 3rd Generation Partnership Project (3GPP) propose using multi-points coordinated transmission technology to improve capability of system in its next generation mobile cellular communication system that long term evolution advanced (LTE-Advanced).

Multi-points coordinated transmission technology is the cooperation between multiple transmission points which are separated from each other geometrically. Generally speaking, the multiple transmission points are base stations of different cells or base stations within the same cell. Multi-points coordinated transmission technology comprises downlink coordinated transmission and uplink joint reception. Downlink multi-points coordinated transmission technology comprises two types: joint transmission and coordinated scheduling/beamforming.

Therein, in joint transmission solution, all cells in cooperative cell set send same or different data in same radio resource block to user equipment, that is to say multiple cooperative cells send data to the same user equipment at the same time. By joint transmission, the interference signals between different cells in long term evolution (LTE) system become useful signals, thereby the interference between cells is reduced. FIG. 1 shows a diagram that two cells implement joint transmission by cooperation. In the figure, the two cells send effective data to user equipment (UE) at the same time, the signals sent by the two cells merge in the air and received by the UE. That reduces the interference between cells, improves quality of the transmission signal, thereby, improves the average spectral efficiency and the cell edge transmission rate.

In coordinated scheduling/beamforming (CS/CBF) solution, only serving cell of UE sends data to the UE, at this point it is the same as transmission mode of the existing LTE standard. Other cells in cooperative cell set could use same radio resource block to serve different UE. But in LTE standard, each cell sends signal without considering interference to transmission signal of other cells, cells don't implement coordination to transmitting direction and resource between each other. However, in CBF solution, when each cell in cooperative cell set sends signal, it need to implement coordination, according to interference to signal of other cell, to reduce interference to UE in other cells as far as possible. According to the coordination of sending signal beam direction between cooperative cells, it effectively prevents the beam with strong interference, then reduces mutual interference, improves quality of receiving signal. FIG. 2 shows a diagram that two cooperative cells prevent interference sending signal beam direction of service UE, according to coordination scheduling.

But, in the existing CBF solution, each cooperative cell need to send scheduling information of sub-bands in each sub-frame to neighboring cells through X2 interface, the overhead of X2 interface is very large, it proposes higher requirement to delay and capacity of the X2 interface, then affects the application of the CBF solution in actual system.

SUMMARY OF THE PRESENT INVENTION

The embodiment of the present invention provides a method and device for coordinated scheduling, to implement that less scheduling information is transmitted via an X2 interface, and thus promotes the application of the CBF solution in an actual system.

The embodiment of the present invention provides a method for coordinated scheduling, comprising:

base station establishing the correspondences between sub-bands and spatial information, and communicating the correspondences between sub-bands and spatial information with the base station of a cooperative cell;

said base station implementing coordinated scheduling with the base station of said cooperative cell according to the correspondences between sub-bands and spatial information.

The embodiment of the present invention provides a device for coordinated scheduling, comprising:

correspondence establishing module, is used for establishing the correspondences between sub-bands and spatial information, and communicating the correspondences between sub-bands and spatial information with the base station of a cooperative cell;

scheduling module, is used for implementing coordinated scheduling with the base station of said cooperative cell according to the correspondences between sub-bands and spatial information established by the correspondence establishing module.

Comparing with existing technology, the embodiment of the present invention have at least the following advantage:

Base station establishes the correspondences between sub-bands and spatial information, communicates the correspondences between sub-bands and spatial information with the base station of a cooperative cell, and implements coordinated scheduling with the base station of said cooperative cell according to the correspondences between sub-bands and spatial information, thereby, implements that less scheduling information is transmitted via an X2 interface, and thus promotes the application of the CBF solution in an actual system.

BRIEF DESCRIPTION OF THE DRAWINGS

FIG. 4 is a flow diagram of the coordinated scheduling method provided in embodiment 3 of the present invention;

DETAILED DESCRIPTION OF THE EMBODIMENTS OF THE PRESENT INVENTION

Embodiment of this invention will be clearly and completely described with pictures in the following. Apparently, the following embodiment is only a part of this invention, but not the whole invention. All the embodiments achieved by general technical personnel in this field based on this application without creative work belong to the protection scope of the present application.

The core idea of the embodiment of the present invention is: base station obtains the precoding matrix indicator (PMI), worst precoding matrix indicator (WPI), or direction information of UE in its serving cell, groups UE according to PMI, WPI, or direction information, UEs in the same group have same/similar PMI, WPI, or direction information; the base station allocates sub-band resource to UE in each group, one sub-band is corresponding to the same/similar PMI, WPI, or direction information, obtains direction which generates strong interference to said cooperative cell, and/or direction which suffers strong interference from said cooperative cell, to implement avoidance or interference suppression in scheduling.

Figure 1:
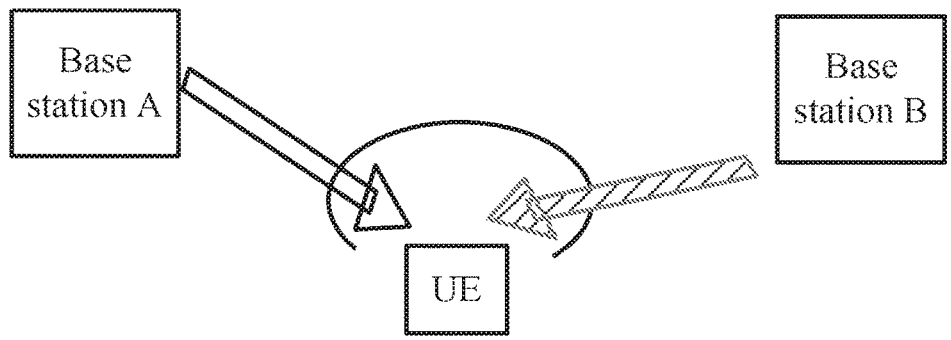
FIG. 1 is an existing technology diagram that two cells implement joint transmission by cooperation.
Figure 2:
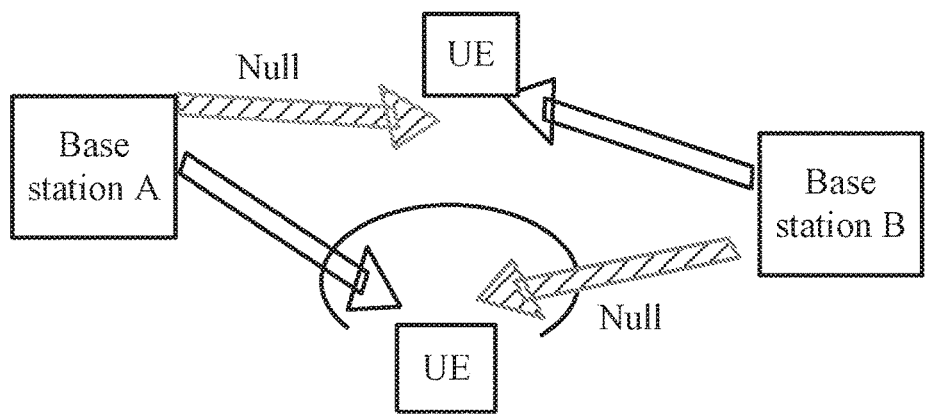
FIG. 2 is an existing technology diagram that two cooperative cells prevent interference sending signal beam direction of service UE, according to coordination scheduling
Figure 3A:
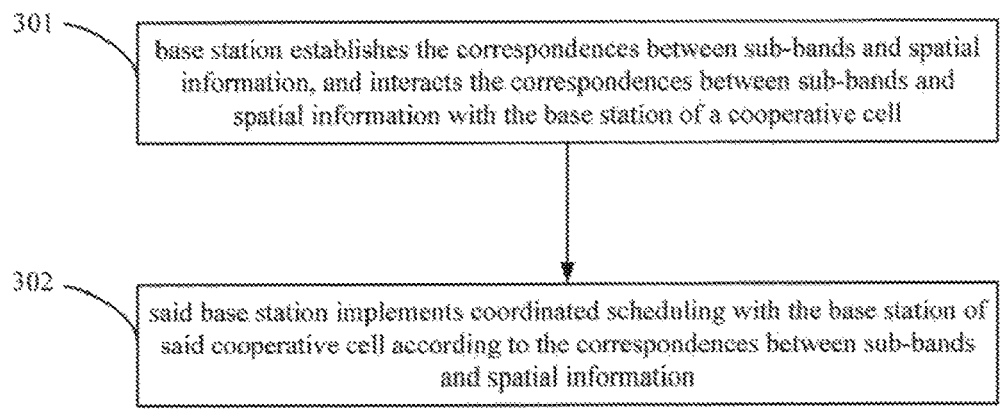
FIG. 3a is a flow diagram of the coordinated scheduling method provided in embodiment 1 of the present invention.

The embodiment 1 of the present invention provides a method for coordinated scheduling, as it is shown in FIG. 3a, comprising the following steps:

Step 301. base station establishes the correspondences between sub-bands and spatial information, and communicates the correspondences between sub-bands and spatial information with the base station of a cooperative cell.

Step 302, said base station implements coordinated scheduling with the base station of said cooperative cell according to the correspondences between sub-bands and spatial information.

Figure 3B:
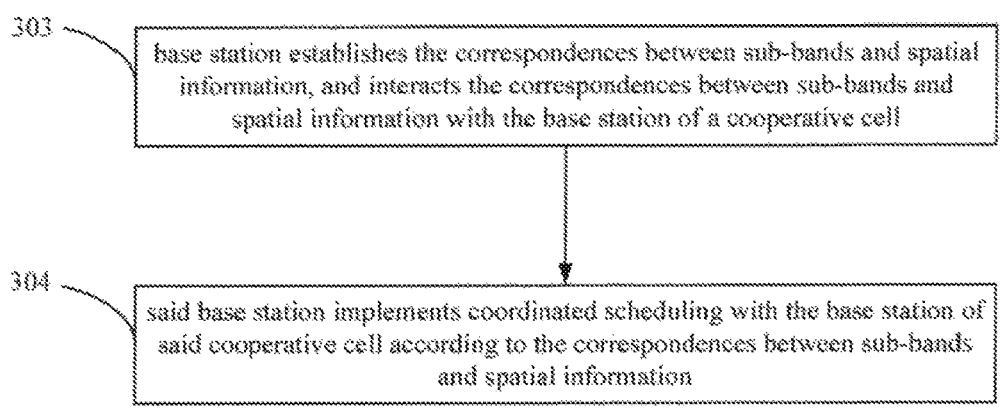
FIG. 3b is a flow diagram of the coordinated scheduling method provided in embodiment 2 of the present invention.

The embodiment 2 of the present invention provides a method for coordinated scheduling, as it is shown in FIG. 3b, comprising the following steps:

Step 303, base station establishes the correspondences between sub-bands and spatial information, and communicates the correspondences between sub-bands and spatial information with the base station of a cooperative cell.

Said base station establishing the correspondences between sub-bands and spatial information, comprising: said base station groups the user equipments in serving cell, user equipments in same group are corresponding to same/similar spatial information; said base station establishes the correspondences between sub-bands and groups of user equipments, thereby establishes the correspondences between sub-bands and spatial information.

Said user equipments in same group are corresponding to same/similar spatial information, is: user equipments in same group being corresponding to same/similar PMI, WPI, best precoding matrix indicator (BPI), or direction information.

Before said base station groups the user equipments in serving cell, further comprising:

Said base station receives PMI that user equipment in serving cell chooses according to the channel from said base station to said user equipment and reports, and WPI that user equipment in serving cell chooses according to the channel from the base station of said cooperative cell to said user equipment and reports.

Said base station receives the channel sounding reference signal reported by user equipment, to get the channel information and direction information of the user equipment.

Step 304, said base station implements coordinated scheduling with the base station of said cooperative cell according to the correspondences between sub-bands and spatial information.

Said base station implements coordinated scheduling with the base station of said cooperative cell according to the correspondences between sub-bands and spatial information, comprising:

Said base station obtains precoding matrix or beamforming direction/weight in a sub-band which generates strong interference to cooperative cell, and/or UE in a sub-band which suffers strong interference from cooperative cell;

Said cooperative cell prevents using the precoding matrix or beamforming direction/weight which generates strong interference to the cooperative cell, and/or prevents scheduling the UE which suffers strong interference from cooperative cell.

Specifically, said base station implements coordinated scheduling with the base station of said cooperative cell according to the correspondences between sub-bands and spatial information, comprising:

When the WPI of cooperative cell reported by a UE is same as or similar to the PMI sent by the base station of said cooperative cell, said base station prevents scheduling the said UE on this sub-band; or, when the PMI reported by a UE is same as or similar to the WPI sent by the base station of said cooperative cell, said base station prevents using the precoding matrix corresponding to this PMI, that is to say, it should prevent scheduling these UEs.

Said base station implements coordinated scheduling with the base station of said cooperative cell according to the correspondences between sub-bands and spatial information, comprising:

Said base station obtains direction which generates strong interference to said cooperative cell, and/or direction which suffers strong interference from said cooperative cell, according to direction information of user equipments in its serving cell and direction information sent by the base station of said cooperative cell;

Said base station prevents implementing scheduling on the obtained direction.

The embodiment 3 of the present invention provides a method for coordinated scheduling, base station and base station of cooperative cell communicate the PMI will be used, when base station learns that the WPI of some sub-band reported by UE in its serving cell is same as or similar to the PMI will be used on the sub-band of some cooperative cell, the base station prevents scheduling UE on this sub-band. Thereby, it could reduce possibility of suffering strong interference from cooperative cell, then implements coordinated scheduling between cooperative cells by less information communication, improves spectral efficiency of cell edge UE.

Specifically, the embodiment 3 of the present invention provides a method for coordinated scheduling, as it is shown in FIG. 4, comprising the following steps:

Step 401, UE chooses precoding matrix according to the channels from serving cell and cooperative cell to the UE, and informs the serving cell.

Specifically, UE could have one cooperative cell or multiple different cooperative cells. When UE has multiple different cooperative cells, UE chooses precoding matrix according to channels from the different cooperative cells to the UE, the chosen precoding matrix could be same or different. This moment, when UE reports the precoding matrix to the serving cell, the UE could add identification information of the cooperative cell corresponding to the precoding matrix into the information reported to the serving cell.

UE chooses precoding matrix according to channel from base station of serving cell to UE, reports the index of the precoding matrix in a codebook (the index is exactly the PMI) to the serving cell.

A possible choosing method for PMI is:

$$\text{PMI} = \arg\max_{k \in \{1,2,\ldots,N\}} \|H_1 V_k\|^2 \quad (1)$$

Therein, N is the number of elements in the codebook, $\{V_1, \ldots, V_N\}$ is pre-defined codeword, $H_1$ is channel matrix between the base station of serving cell and UE.

UE chooses precoding matrix according the channel from the base station of cooperative cell to the UE, the chosen precoding matrix is the precoding matrix which generates biggest interference to the UE, the precoding matrix is also chosen from a same codebook, the index of the chosen precoding matrix in the codebook is exactly the WPI, the UE reports the WPI to the serving cell. The meaning of the WPI could be as follow, if the UE is scheduled on some sub-band, then, that base station of cooperative cell sends data on the sub-band using the precoding matrix corresponding to the WPI, will generate strong interference to the UE, that is to say, the base station of the cooperative cell should prevent using the precoding matrix corresponding to this WPI as far as possible.

The choosing formula of WPI is:

$$\text{WPI} = \arg\max_{k \in \{1,2,\ldots,N\}} \|H_2 V_k\|^2 \quad (2)$$

Therein, $H_2$ is the channel matrix between the base station of cooperative cell and UE.

The PMI and WPI could be reported for wideband, also could be reported for sub-band. The codebook of PMI and WPI could be same or different.

Step 402, the base station implements grouping to UEs according to the precoding matrix reported by the UEs, and allocates corresponding sub-band for each UE groups, establishes the correspondence between PMI, UE group and sub-band allocated to the UE group.

Specifically, the base station obtains the PMI reported by UE, groups UEs with same PMI or UEs whose precoding matrix distance to each other is less than default value into one group, the measurement of distance is Euclidean distance.

The UE participates in the grouping could be all the UEs in the cell, also could be part of the UEs, such as cell edge UE.

The base station allocates sub-band to each UE group, establishes correspondence between sub-bands, UE groups and PMIs.

The method that base station allocates sub-band resource to UE group could be set according to the actual needs, such as allocating sub-band to the UE group with biggest total rate on the sub-band.

If UE reports sub-band PMI, then the grouping condition of UE on each sub-band could be different.

The base station could periodically renew the UE groups according to the PMI reported by the UE, or renew the UE groups right after receiving the PMI, or renew the UE groups according to the preset trigger event. In the embodiment of the present invention, interval of renewing UE groups is longer than transmission delay of X2 interface.

Step 403, the base station sends the correspondences between sub-bands and PMIs to the base station of cooperative cell via interface, and receives the correspondences between sub-bands and PMIs sent by the base station of cooperative cell, this interface could specially be X2 interface or other interfaces set according to actual requirements.

Step 404, on each sub-band, the base station schedules UEs in the UE group corresponding to the sub-band, and when the precoding matrix corresponding to the PMI reported by UE is same as or similar to the precoding matrix corresponding to the WPI sent by the base station of cooperative cell, the base station prevents scheduling the UE on this sub-band.

Specifically, when the base station implements scheduling, on each sub-band, the base station schedules UEs in the UE group corresponding to the sub-band. Besides, the base station receives the PMI information of this sub-band sent by the base station of cooperative cell. When the WPI of this sub-band received by the base station reported by the UE is same as or similar to the PMI of this sub-band sent by the base station of the cooperative cell, it is shown that, if the base station schedules this UE on this sub-band, then the UE would suffer strong interference from this cooperative cell. Therefore, when scheduling, the base station should prevent scheduling UE, the WPI reported by which is same as or is similar to the PMI sent by the base station of the cooperative cell. For example, according to the information sent by cooperative cell, on some sub-band, the cooperative cell would use PMI1 to transmit, if WPIs of the cooperative cell reported by any UEs in serving cell is same as or similar to PMI1, then the base station would prevent scheduling these UEs onto this sub-band as far as possible, or schedule these UEs onto this sub-band with low priority.

Figure 5:
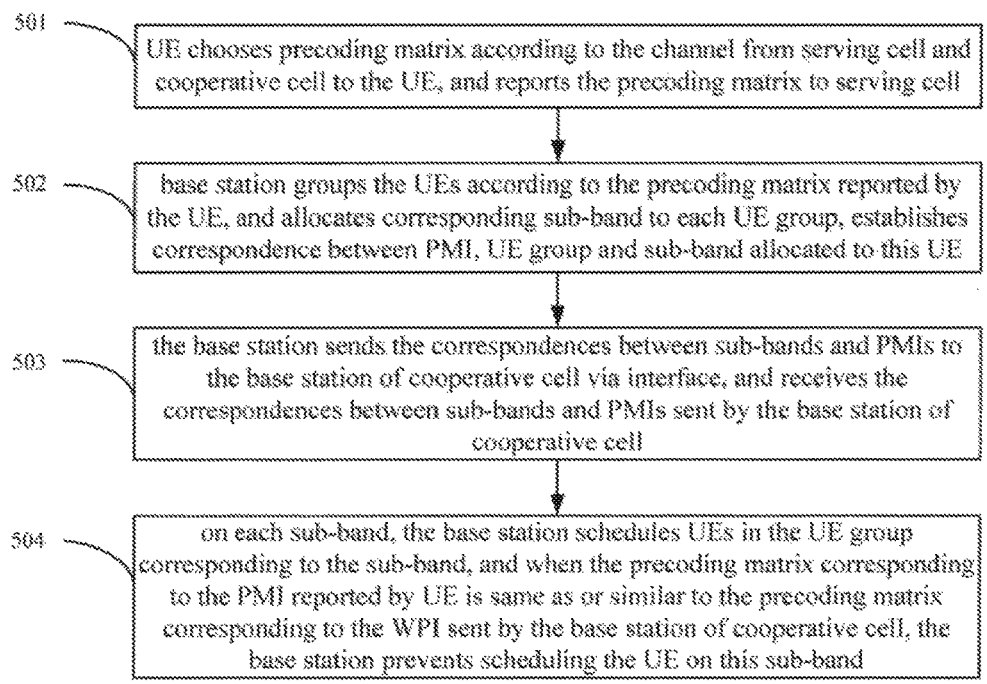
FIG. 5 is a flow diagram of the coordinated scheduling method provided in embodiment 4 of the present invention.

Specifically, the embodiment 4 of the present invention provides a method for coordinated scheduling, as it is shown in FIG. 5, comprising the following steps:

Step 501, UE chooses precoding matrix according to the channel from serving cell and cooperative cell to the UE, and reports the precoding matrix to serving cell. The specific content could be referenced in step 401.

Step 502, the base station groups the UEs according to the precoding matrix reported by the UE, and allocates corresponding sub-band to each UE group, establishes correspondence between PMI, UE group and sub-band allocated to this UE.

Step 503, the base station sends the correspondences between sub-bands and PMIs to the base station of cooperative cell via interface, and receives the correspondences between sub-bands and PMIs sent by the base station of cooperative cell, this interface could specially be X2 interface or other interfaces set according to actual requirements.

Specifically, step 501-503 is similar to step 401-403, so the specific content could be referenced in step 401-403

Step 504, on each sub-band, the base station schedules UEs in the UE group corresponding to the sub-band, and when the precoding matrix corresponding to the PMI reported by UE is same as or similar to the precoding matrix corresponding to the WPI sent by the base station of cooperative cell, the base station prevents scheduling the UE on this sub-band.

Specifically, when the base station implements scheduling, on each sub-band, the base station schedules UEs in the UE group corresponding to the sub-band. Besides, the base station receives the WPI information of this sub-band sent by the base station of cooperative cell. When scheduling, the base station should prevent scheduling UE, the WPI reported by which is same as or is similar to the PMI sent by the base station of the cooperative cell. For example, according to the information sent by cooperative cell, the WPI on some sub-band is WPI1, if precoding matrices corresponding to PMIs reported by any UEs in home cell are equal or close to the precoding matrix corresponding to WPI1, such as that the difference between precoding matrix corresponding to the PMI reported by UE and precoding matrix corresponding to the WPI1 is in the default value range, then the base station would prevent scheduling these UEs onto this sub-band as far as possible, or schedule these UEs onto this sub-band with low priority.

In the embodiment of the present invention, the base station also could communicate BPI with the base station of the cooperative cell, that the base station of the cooperative cell uses precoding matrix corresponding to this BPI could generate minimum interference to UEs in the home cell. In this way, when scheduling, the base station should use the precoding matrix corresponding to the BPI on corresponding sub-band of the base station of the cooperative cell.

Figure 6:
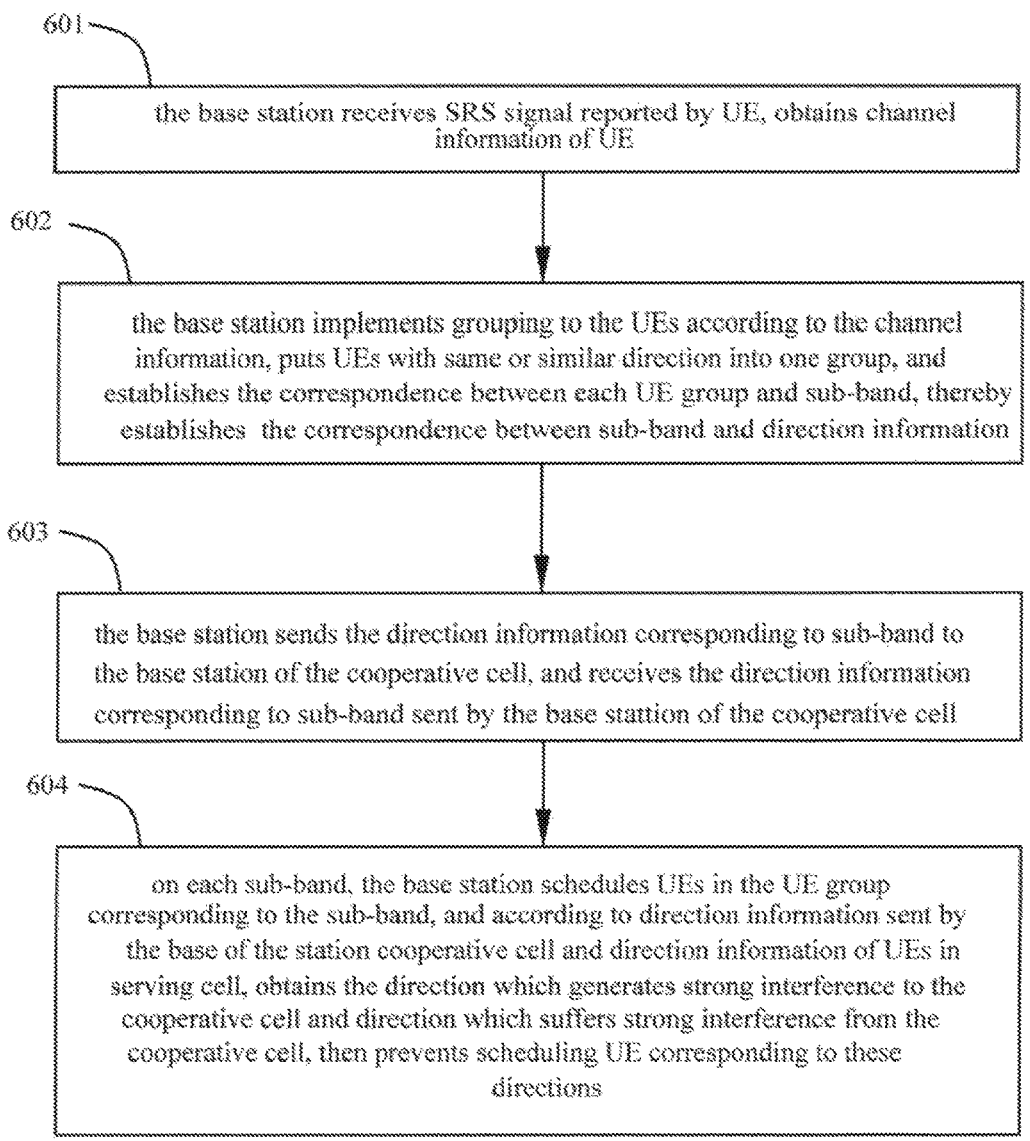
FIG. 6 is a flow diagram of the coordinated scheduling method provided in embodiment 5 of the present invention.

The embodiment 5 of the present invention provides a method for coordinated scheduling, the base station estimates the channel between the base station and the UE and the direction information of UE according to the sounding reference signal (SRS) reported by the UE, and further implements grouping and scheduling to the UE according to the direction information of UE, specifically, as it is shown in FIG. 6, the method comprises the following steps:

Step 601, the base station receives SRS signal reported by UE, obtains channel information of UE.

UE sends SRS signal according to the resource indicated by serving cell, the serving cell of UE receives SRS signal and estimates the channel, further determines the direction information of UE.

Step 602, the base station implements grouping to the UEs according to the channel information, puts UEs with same or similar direction into one group, and establishes the correspondence between each UE group and sub-band, thereby establishes the correspondence between sub-band and direction information.

Specifically, the base station groups UEs in the cell into any groups according to the channel information of UE, the directions of UEs in a same group are same or similar, for example, the difference between angles between the base station normal direction and the direction from different UEs in same group to the base station is less than a standard value set according actual requirement.

The base station allocates sub-band resource to each UE, to make each sub-band correspond to a direction, and correspond to a UE group.

The method that base station allocates sub-band resource to UE group could be set according to the actual needs, such as allocating sub-band to the UE group with biggest total rate on the sub-band.

In the embodiment of the present invention, the base station set trigger event according actual requirement to renew the UE groups, preferably, interval of renewing UE groups is longer than transmission delay of X2 interface, the renewal of the UE groups could also be periodicity renewal.

Step 603, the base station sends the direction information corresponding to sub-band to the base station of the cooperative cell, and receives the direction information corresponding to sub-band sent by the base station of the cooperative cell.

Step 604, on each sub-band, the base station schedules UEs in the UE group corresponding to the sub-band, and according to direction information sent by the base station of the cooperative cell and direction information of UEs in serving cell, obtains the direction which generates strong interference to the cooperative cell and direction which suffers strong interference from the cooperative cell, then prevents scheduling UE corresponding to these directions.

By using the method provided by the embodiment of the present invention, the base station implements grouping to UEs in serving cell, establishes the correspondence between each UE group and sub-band, and the correspondence between sub-band and PMI, or WPI, or direction information, and according to each sub-band, scheduling the corresponding UE, obtains the scheduling sub-bands which generate strong interference to other cells and the scheduling sub-bands which suffer strong interference from other cells, and implements corresponding process, to implement that less scheduling information is transmitted via an X2 interface, and thus promotes the application of the CBF solution in an actual system.

Figure 7:
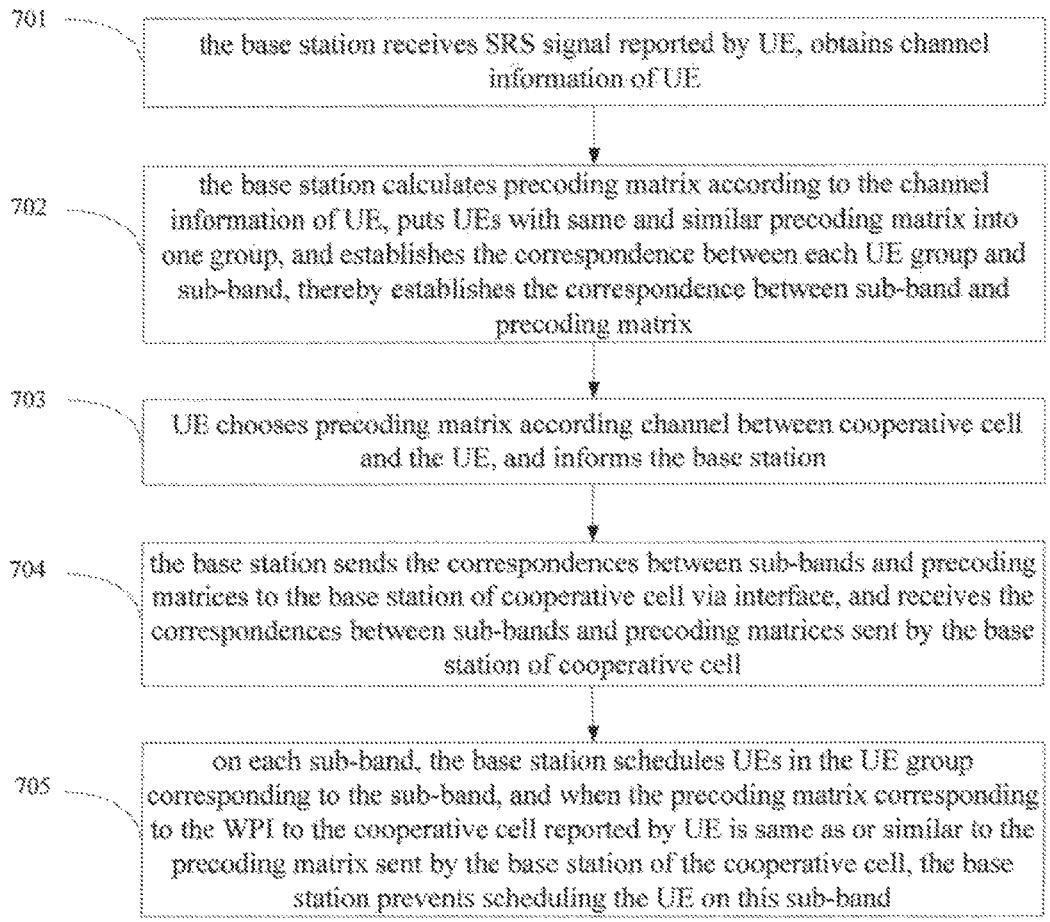
FIG. 7 is a flow diagram of the coordinated scheduling method provided in embodiment 6 of the present invention.

The embodiment 6 of the present invention provides a method for coordinated scheduling, as it is shown in FIG. 7, comprising the following steps:

Step 701, the base station receives SRS signal reported by UE, obtains channel information of UE.

UE sends SRS signal according to the resource indicated by serving cell, the serving cell of UE receives SRS signal and estimates the channel.

Step 702, the base station calculates precoding matrix according to the channel information of UE, puts UEs with same and similar precoding matrix into one group, and establishes the correspondence between each UE group and sub-band, thereby establishes the correspondence between sub-band and precoding matrix.

Step 703, UE chooses precoding matrix according channel between cooperative cell and the UE, and informs the base station.

This precoding matrix is the precoding matrix which generates maximum interference to the UE, the index of the precoding matrix in codebook is exactly the WPI.

Step 704, the base station sends the correspondences between sub-bands and precoding matrices to the base station of cooperative cell via interface, and receives the correspondences between sub-bands and precoding matrices sent by the base station of cooperative cell, this interface could specially be X2 interface or other interfaces set according to actual requirements. This precoding matrix could also be PMI, which is the index of the precoding matrix in codebook.

Step 705, on each sub-band, the base station schedules UEs in the UE group corresponding to the sub-band, and when the precoding matrix corresponding to the WPI to the cooperative cell reported by UE is same as or similar to the precoding matrix sent by the base station of the cooperative cell, the base station prevents scheduling the UE on this sub-band.

Specifically, step 705 is similar to step 504, so the specific content could be referenced in step 504.

Figure 8:
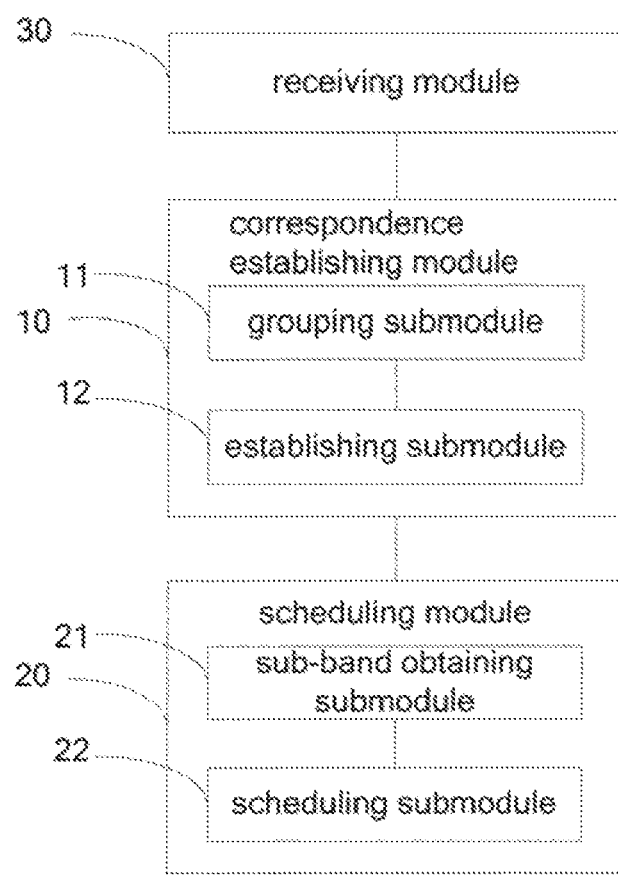
FIG. 8 is a structure diagram of the coordinated scheduling device provided in embodiment 7 of the present invention.

The embodiment 7 of the present invention provides a coordinated scheduling device, as it is shown in FIG. 8, the device comprises:

correspondence establishing module 10, is used for establishing the correspondences between sub-bands and spatial information, and communicating the correspondences between sub-bands and spatial information with the base station of a cooperative cell;

scheduling module 20, is used for implementing coordinated scheduling with the base station of said cooperative cell according to the correspondences between sub-bands and spatial information established by the correspondence establishing module 10.

In the embodiment of the present invention, said correspondence establishing module 10 comprising:

grouping submodule 11, is used for grouping the user equipments in serving cell, user equipments in same group being corresponding to same/similar spatial information;

establishing submodule 12, is used for establishing the correspondences between sub-bands and groups of user equipments, thereby establishing the correspondences between sub-bands and spatial information.

Said user equipments in same group being corresponding to same/similar spatial information, is:

user equipments in same group being corresponding to same/similar precoding matrix indicator (PMI), same/similar worst precoding matrix indicator (WPI) of same cooperative cell, same/similar best precoding matrix indicator (BPI) of same cooperative cell, or direction information.

In the embodiment of the present invention, further comprising:

receiving module 30, is used for receiving PMI that user equipment in serving cell chooses according to the channel from said base station to said user equipment and reports, and WPI or BPI that user equipment in serving cell chooses according to the channel from the base station of said cooperative cell to said user equipment and reports.

Said receiving module 30 is further used for:

receiving the channel sounding reference signal reported by user equipment, to get the channel information and direction information of the user equipment.

Said scheduling module 20 comprising:

sub-band obtaining submodule 21, is used for obtaining the scheduling sub-band which generates strong interference to said cooperative cell, and/or scheduling sub-band which suffers strong interference from said cooperative cell, according to the correspondences between sub-bands and spatial information;

scheduling submodule 22, is used for preventing implementing scheduling on said scheduling sub-band which generates strong interference to said cooperative cell, and/or scheduling sub-band which suffers strong interference from said cooperative cell.

Said scheduling module 20 is specifically used for:

when the WPI reported by user equipment in serving cell is same as or similar to the PMI sent by the base station of said cooperative cell, preventing scheduling this user equipment on the sub-band corresponding to this WPI; or, when the PMI reported by user equipment in serving cell is same as or similar to the WPI sent by the base station of said cooperative cell, preventing scheduling this user equipment on sub-band of this PMI.

Said scheduling module 20 is specifically used for:

obtaining direction which generates strong interference to said cooperative cell, and/or direction which suffers strong interference from said cooperative cell, according to direction information of user equipments in serving cell and direction information sent by the base station of said cooperative cell;

preventing implementing scheduling on the obtained direction.

By using the device provided by the embodiment of the present invention, the base station implements grouping to UEs in serving cell, establishes the correspondence between each UE group and sub-band, and the correspondence between sub-band and PMI, or WPI, or direction information, and according to each sub-band, scheduling the corresponding UE, obtains the scheduling sub-bands which generate strong interference to other cells and the scheduling sub-bands which suffer strong interference from other cells, and implements corresponding process, to implement that less scheduling information is transmitted via an X2 interface, and thus promotes the application of the CBF solution in an actual system.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, including a number of instructions for making a computer device (such as mobile phone, personal computers, servers, or network equipments, etc.) implement the methods described in the embodiments of the present invention.

The technical personnel in this field can understand the figures are only the diagrams of preferable embodiments, the modules or process in the figures is not necessary to implement the present invention.

The technical personnel in this field can understand the modules of the devices in the embodiments can be set in the devices according to the description of the embodiments, also can be set in one or more devices different from the embodiments. Modules in the above-mentioned embodiments can be combined into one module, also can be further split into multiple sub-modules.

Serial numbers of the above-mentioned embodiments of the present invention are only used for description, it does not express whether the embodiment is excellent or poor.

The public content is only some specific embodiments of the present invention. However, the invention is not limited by these, whatever modifications can be imagined by the technical personnel in this field all should be in the protective range of the present invention.

The invention claimed is:

1. A method for coordinated scheduling, comprising:
    establishing, by a first base station, correspondences between sub-bands and spatial information, and communicating, by the first base station, the correspondences between sub-bands and spatial information with a base station of a cooperative cell;
    obtaining, by the first base station, scheduling sub-band which suffers strong interference from said cooperative cell, according to the correspondences between sub-bands and spatial information;
    preventing, by the first base station, implementing scheduling on said scheduling sub-band which suffers strong interference from said cooperative cell;

wherein, establishing, by the first base station, the correspondences between sub-bands and spatial information, comprising:
grouping, by the first base station, user equipments in serving cell, user equipments in same group being corresponding to same/similar spatial information;
establishing, by the first base station, the correspondences between sub-bands and groups of user equipments, thereby establishing the correspondences between sub-bands and spatial information.

2. The method according to claim 1, wherein, said user equipments in same group being corresponding to same/similar spatial information, is:
user equipments in same group being corresponding to same/similar precoding matrix indicator (PMI), same/similar worst precoding matrix indicator (WPI) of same cooperative cell, same/similar best precoding matrix indicator (BPI) of same cooperative cell, or direction information.

3. The method according to claim 2, wherein, before grouping, by the first base station, the user equipments in serving cell, further comprising:
receiving, by the first base station, PMI that user equipment in serving cell chooses according to the channel from the first base station, to said user equipment and reports, and WPI or BPI that user equipment in serving cell chooses according to the channel from the base station of said cooperative cell to said user equipment and reports.

4. The method according to claim 2, wherein, before grouping, by the first base station, the user equipments in serving cell, further comprising:
receiving, by the first base station, the channel sounding reference signal reported by user equipment, to get the channel information and direction information of the user equipment.

5. The method according to claim 3, wherein, preventing, by the first base station, implementing scheduling on said scheduling sub-band which suffers strong interference from said cooperative cell, comprising:
when the WPI reported by user equipment in serving cell is same as or similar to the PMI sent by the base station of said cooperative cell, preventing, by the first base station, scheduling this user equipment on the sub-band corresponding to this WPI; or,
when the PMI reported by user equipment in serving cell is same as or similar to the WPI sent by the base station of said cooperative cell, preventing, by the first base station, scheduling this user equipment on sub-band of this PMI.

6. The method according to claim 4, wherein, preventing, by the first base station, implementing scheduling on said scheduling sub-band which suffers strong interference from said cooperative cell, comprising:
obtaining, by the first base station, information of direction which suffers strong interference from said cooperative cell according to direction information of user equipments in serving cell and direction information sent by the base station of said cooperative cell;
preventing, by the first base station, implementing scheduling on the obtained direction.

7. A device for coordinated scheduling, comprising:
a correspondence establishing module, used for establishing correspondences between sub-bands and spatial information, and communicating the correspondences between sub-bands and spatial information between a first base station and a base station of a cooperative cell;
a scheduling module, comprising:
a sub-band obtaining submodule, used for obtaining scheduling sub-band which suffers strong interference from said cooperative cell, according to the correspondences between sub-bands and spatial information;
a scheduling submodule, used for preventing implementing scheduling on said scheduling sub-band which suffers strong interference from said cooperative cell;
wherein, said correspondence establishing module comprises:
a grouping submodule, used for grouping user equipments in serving cell, user equipments in same group being corresponding to same/similar spatial information;
an establishing submodule, used for establishing the correspondences between sub-bands and groups of user equipments, thereby establishing the correspondences between sub-bands and spatial information.

8. The device according to claim 7, wherein, further comprising:
a receiving module, used for receiving PMI that user equipment in serving cell chooses according to the channel from the first base station to said user equipment and reports, and WPI or BPI that user equipment in serving cell chooses according to the channel from the base station of said cooperative cell to said user equipment and reports.

9. The device according to claim 8, wherein, said receiving module is further used for:
receiving the channel sounding reference signal reported by user equipment, to get the channel information and direction information of the user equipment.

10. The device according to claim 8, wherein, said scheduling module is specifically used for:
when the WPI reported by user equipment in serving cell is same as or similar to the PMI sent by the base station of said cooperative cell, preventing scheduling this user equipment on the sub-band corresponding to this WPI; or,
when the PMI reported by user equipment in serving cell is same as or similar to the WPI sent by the base station of said cooperative cell, preventing scheduling this user equipment on sub-band of this PMI.

11. The device according to claim 9, wherein, said scheduling module is specifically used for:
obtaining direction which suffers strong interference from said cooperative cell, according to direction information of user equipments in serving cell and direction information sent by the base station of said cooperative cell;
preventing implementing scheduling on the obtained direction.

12. A method for coordinated scheduling, comprising:
establishing, by a first base station, correspondences between sub-bands and spatial information, and communicating, by the first base station, the correspondences between sub-bands and spatial information with a base station of a cooperative cell;
obtaining, by the first base station, scheduling sub-band which suffers strong interference from said cooperative cell, according to the correspondences between sub-bands and spatial information;
preventing, by the first base station, implementing scheduling on said scheduling sub-band which suffers strong interference from said cooperative cell;
wherein the correspondences between sub-bands and spatial information are correspondences between sub-bands and groups of user equipments, and user equipments in same group are corresponding to same/similar PMI, WPI, best precoding matrix indicator (BPI), or direction information.

\* \* \* \* \*